United States Patent [19]
Carmichael

[11] Patent Number: 5,434,632
[45] Date of Patent: Jul. 18, 1995

[54] IMAGE PROJECTION APPARATUS WITH A AUTOFOCUSING SYSTEM

[75] Inventor: A. Carmichael, Eindhoven, Netherlands

[73] Assignee: U.S. Philips Corporation, New York, N.Y.

[21] Appl. No.: 204,976

[22] Filed: Mar. 2, 1994

[30] Foreign Application Priority Data

Mar. 22, 1993 [EP] European Pat. Off. ............ 93200826

[51] Int. Cl.⁶ ................................................ G03B 3/00
[52] U.S. Cl. ...................................... 353/101; 348/745
[58] Field of Search ................. 353/101, 122, 97, 121, 353/31, 34, 37; 348/745, 806

[56] References Cited

U.S. PATENT DOCUMENTS

| | | | |
|---|---|---|---|
| 3,639,048 | 2/1972 | Heaney et al. | 353/101 |
| 3,672,757 | 6/1972 | Szymber et al. | 353/101 |
| 3,856,392 | 12/1974 | Harrison | 353/101 |
| 5,046,837 | 9/1991 | Strommer et al. | 353/82 |
| 5,098,184 | 3/1992 | Van Den Brandt et al. | |
| 5,235,363 | 8/1992 | Vogeley et al. | 353/42 |
| 5,276,523 | 1/1994 | Kurematsu et al. | 353/101 |

FOREIGN PATENT DOCUMENTS

| | | |
|---|---|---|
| 0266184 | 5/1988 | European Pat. Off. |
| 0467447 | 1/1992 | European Pat. Off. |
| 2107602 | 9/1993 | France |
| 3141336 | 6/1991 | Japan |
| 3149538 | 6/1991 | Japan |
| 2239085 | 10/1991 | Japan |

Primary Examiner—William A. Cuchlinski, Jr.
Assistant Examiner—William C. Dowling
Attorney, Agent, or Firm—Michael J. Balconi-Lamica

[57] ABSTRACT

An image projection device comprising at least one display panel (26, 27, 28), a projection lens system (C) and a focus-error detection system is described. The focus-error detection system comprises an auxiliary radiation source (50) delivering a focus measuring beam (b), an auxiliary lens (61) for capturing radiation ($b_r$) diffusely reflected by a projection screen (D), and a detection unit (60) for measuring the size of a spot (S) formed on the screen by the beam (b).

15 Claims, 6 Drawing Sheets

IMAGE PROJECTION APPARATUS WITH A AUTOFOCUSING SYSTEM

BACKGROUND OF THE INVENTION

The invention relates to an image projection apparatus comprising a display system having at least a display panel for generating an image to be projected, a projection lens system for projecting the image formed by the display system on a projection screen, a focus-error detection system provided with an auxiliary radiation source which supplies a focus measuring beam, and a detection unit for converting the focus measuring beam radiation reflected by the projection screen into a focus-error signal.

The term image projection device is considered to have a wide meaning and comprises a device for displaying, for example a video image, a graphic image, numerical information or a combination thereof. The images may be both monochrome and color images. In the latter case the display system may comprise three chrominance channels for, for example the primary colors red, green and blue, each accommodating a display panel. A display panel may be constituted by the display screen of a cathode ray tube but is preferably a liquid crystalline panel. In the latter case the display system comprises an illumination unit for illuminating the panel or the panels.

In the current image projection devices which comprise one projection lens system in the form of a zoom lens for projecting a magnified image on a projection screen which is present at, for example several meters from the projection device, each change of the projection distance necessitates refocusing of the image by readjusting the zoom lens manually or possibly via a remote control unit. Moreover, optical elements of the image projection device may be displaced with respect to each other due to, inter alia temperature variations, so that the projected image may be refocused. The known image projection devices thus require an additional quantity of time, attention and expertise of the user. The convenience of use of an image projection device would be enhanced considerably if it were provided with an autofocus system, i.e. a system with which the distance between a display panel and the projection screen is measured and the focus of the projection lens system is automatically adjusted with reference to said measurement.

An image projection device in which an auxiliary radiation source emits an invisible, infrared measuring beam to the screen and in which the radiation beam reflected by the screen is received by a position-sensitive detector is described in the published Japanese Patent Application (Kokai) 3-149538. The distance between the screen and a reference plane, the plane of the radiation source and/or the detector can be determined by means of this system which is referred to as triangulation system. This information is used to displace the entire projection lens system along the optical axis so that the distance between this system and the screen can be adapted to the focal length of the projection lens system. This system has the drawback that the measuring beam is optically not coupled to the projection lens system and the display panel so that it is not ensured that the focal length of the projection lens system is always adapted to the distance between the screen and the display panel.

SUMMARY OF THE INVENTION

It is an object of the present invention to provide a focus-error detection system for an image projection apparatus which is based on a novel concept and is very efficient and inexpensive. To this end the image projection device according to the invention is characterized in that the auxiliary radiation source is arranged in a plane which, viewed from the projection lens system, effectively coincides with the plane of a display panel, the auxiliary radiation source is imaged by the projection lens system into a spot on the projection screen, an auxiliary lens system is provided for imaging the spot into a secondary spot on the detection unit and in that this unit is a spot size measuring unit.

This focus-error detection system detects whether the display panel is always sharply imaged on the projection screen, independent of the distance between the projection lens system and the image projection device, so that e.g. the focal length of the projection lens system can be adjusted if that is not the case. Moreover, the focus-error is measured via the projection lens system.

It is remarked that the Abstract of Japanese Patent Application 3-239085 laid open to public inspection discloses an image projection apparatus with a focus-error detection system wherein the focus-error is measured via the projection lens system. However the focus measuring beam is not supplied by an auxiliary radiation source effectively arranged in the plane of a display panel but from the main radiation source which supplies the projection beam, which source is arranged behind the display panel. In the known apparatus the distance between the main radiation source and the projection screen is measured and not the distance between a display panel and the projection screen. Moreover, in this apparatus the focus measuring beam is not focused to a spot on the projection screen and for measuring a focus-error it is necessary to move a reflector normally arranged in one the colour channels outside this channel so that the focus measuring beam can reach a sensor positioned in the light path behind said mirror.

The reflected focus measuring beam is the beam formed by that part of the focus measuring beam radiation reflected by the projection screen that is captured by the auxiliary lens system and reaches the detection unit. Since the projection screen should spread the signal-light from the display system over a large viewer's space, it behaves as a diffuse reflector for the focus measuring beam. As a result only a part of the focus measuring beam radiation reflected by the projection screen enters the auxiliary lens system so as to be concentrated on the detection system. The intensity of this part of the reflected focus measuring beam radiation is sufficiently large to generate a suitable focus-error signal.

The adjustment of the focal length of the projection lens system may be effected by moving the entire projection lens system along its optical axis under control of the focus-error signal.

An image projection device in which the projection lens system is a zoom lens is preferably further characterized in that the focus-error signal is applied to an actuator for an adjustable lens group of the zoom lens.

The adjustable lens group is preferably the group referred to as front group of the zoom lens.

It is to be noted that an image projection device in which an automatic focus-error detection system controls the front group of a zoom projection lens system is described in the published Japanese Patent Application (Kokai) 3-141336. However, this Patent Application does not show how the focus-error signal is generated.

The image projection device may be further characterized in that the auxiliary radiation source is present in the plane of the display panel outside this panel.

It should then be ensured that the screen is larger than the largest size of the projected image.

This is no longer necessary in a preferred embodiment of the image projection device which is characterized in that the auxiliary radiation source is arranged in a plane which is the mirror image of the plane of a display panel with respect to a wavelength-selective reflector extending at an acute angle to the optical axis of the projection lens system.

This reflector is, for example, a dichroic mirror which reflects the visible light from the display panel and passes the radiation, for example infrared radiation from the auxiliary radiation source.

This embodiment is preferably further characterized in that the acute angle is an angle of 45° and in that the auxiliary radiation source is in an even line with said optical axis.

Then the focus-error is measured on the optical axis of the projection lens system, which has the advantage that the focus measuring beam is perpendicularly incident on the projection screen.

Also with respect to the detection unit several embodiments are possible. A first embodiment of such unit is characterized in that it comprises a CCD-photodiode matrix arranged at the position where the secondary spot is formed upon correct imaging of the auxiliary radiation source on the projection screen.

In this embodiment the size of the secondary spot is measured by electronic means and the number of optical elements is minimum.

In order to increase the capture range while maintaining the sensitivity, this embodiment, and other embodiments to be described later on may be further characterized in that a first surface of the detection unit, through which the reflected focus measuring beam enters this unit, is arranged at an acute angle with the optical axis of the auxiliary lens system.

An embodiment of the apparatus which is alternative to the embodiment with the photodiode matrix, is characterized in that the detection unit comprises a diaphragm arranged at the position where the secondary spot is formed when the auxiliary source is sharply imaged on the projection screen and a photodetector arranged behind the diaphragm opening.

The size of the secondary spot is measured then by detecting the amount of radiation passing through the diaphragm opening.

The latter embodiment may be further characterized in that the size of the diaphragm opening corresponds to the size of the secondary spot formed when the focus measuring beam is focused on the projection screen. A focus-error signal with a large signal to noise ratio can be obtained then.

Alternatively, the embodiment may be characterized in that the diaphragm opening is a slit, the length direction of which is parallel to the direction along which the secondary spot moves upon displacement of the projection screen along the optical axis of the projection lens system. An increased capture range is obtained then while the sensitivity is maintained.

Another embodiment, also having a large capture range, is characterized in that the detection unit comprises in this order and viewed from the auxiliary lens system, an anamorphotic system, a diaphragm having a slit opening with the slit-direction substantially parallel to the direction of maximum power of the anamorphotic system, and a photodetector. The anamorphotic system may comprise one or two cylindrical lenses or prisms.

In order to detect both the magnitude and the sign of a focus-error all of the above embodiments are characterized in that means are provided for periodically moving the first spot with respect to the projection screen and in that the output of the detection unit is coupled to one input of a signal processing circuit, another input of which is coupled to the said means for axially moving the first spot.

The said means may be constituted by an actuator for periodically and axially moving the auxiliary radiation source or by an actuator for periodically moving the projection lens system or a movable lens group of this lens system.

With axial is meant along the optical axis of the projection lens system.

A further embodiment wherein the output signal of the detection unit is indicative of the magnitude and the sign of a focus-error is characterized in that the radiation source comprises at least two radiation emitting elements displaced from one another in both a first direction parallel to the optical axis of the projection lens system and a second direction perpendicular to the first direction and in that the detection unit comprises a number of detectors corresponding to the number of radiation emitting elements.

BRIEF DESCRIPTION OF THE DRAWINGS

These and other aspects of the invention will be apparent from and elucidated with reference to the embodiments described hereinafter. In the drawings.

DETAILED DESCRIPTION OF THE PREFERRED EMBODIMENTS

Figure 1:
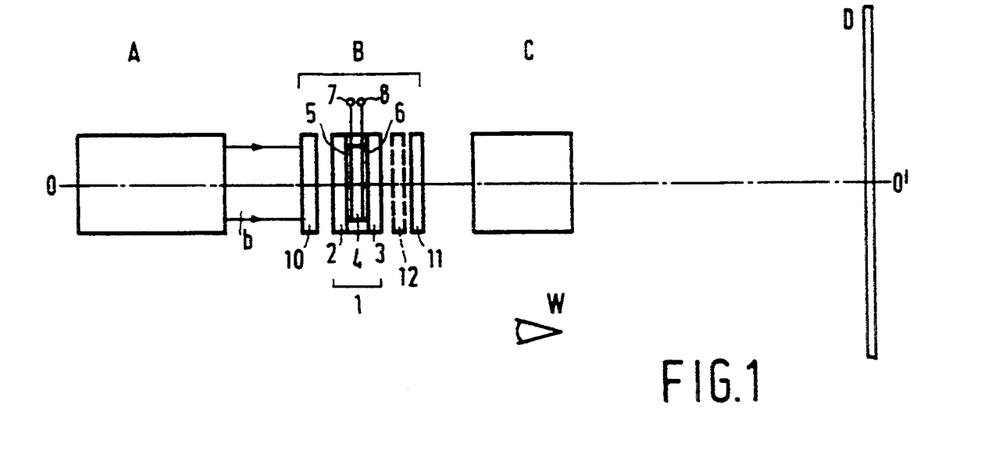
FIG. 1 shows the diagram of a known image projection apparatus.

In FIG. 1 the block A denotes an illumination system emitting a light beam b whose chief ray coincides with the optical axis OO' of the image projection apparatus. This beam is incident on the image display system B which, in the case of projecting a monochromatic image, comprises one display panel 1. This panel is, for example a liquid crystal display (or LCD) panel. Such a panel comprises a layer of liquid crystalline material 4, for example of the nematic type which is enclosed between two transparent plates 2 and 3, for example of glass. Drive electrodes 5 and 6 are arranged on each plate. These electrodes may be arranged in a large number of rows and columns, thus defining a large number of pixels in the display panel. The different pixels are driven by driving the matrix electrodes as is diagrammatically shown by means of the drive terminals 7 and 8. Thus, an electric field can be applied at the desired positions across the liquid crystalline material 4. Such an electric field causes a variation of the effective refractive index of the material 4 so that the light passing through a given pixel undergoes or does not undergo a rotation of the direction of polarization, dependent on the absence or presence of a local electric field at the location of the relevant pixel.

Instead of this passive-drive image display panel, an active-drive panel may be used. In the last-mentioned display panel one of the supporting plates comprises an electrode while the other plate is provided with the semiconductor drive electronics. Each pixel is now driven by its own active drive element such as, for example a thin-film transistor. Both types of direct-drive display panels are described in, for example European Patent Application no. 0 266 184.

The beam incident on the display panel 1 should be polarized, preferably linearly polarized. However, the illumination system A produces unpolarized light. A linearly polarized component having the desired direction of polarization is selected from this light by means of a polarizer 10. An analyzer 11 whose direction of polarization is, for example effectively parallel to that of the polarizer 10 is arranged in the path of the light passed by the display panel. Consequently, the light from those pixels which are energized and which do not change the direction of polarization of the beam is passed by the analyzer towards a projection lens system C. The light from the non-energized pixels which rotate the direction of polarization of the beam through 90°, is blocked by the analyzer. The analyzer thus converts the polarization modulation of the beam into an intensity modulation. The projection lens system C projects the image formed on the panel 1 on a projection screen D. This projected image can be watched by a viewer W.

The illumination system may comprise a high-power lamp, a reflector arranged at one side of the lamp and a condensor system arranged at the other side of the lamp. This condensor system may be implemented as described in U.S. Pat. No. 5,046,837 and has not only a large light-collection power but also a low throughput so that the numerical aperture and cross-section of further optical elements in the projection device, such as the projection lens C, may remain limited, which has a favourable effect on the cost price of the device.

The illumination system is preferably implemented as described in EP Patent Application no. 0 395 156 and comprises two lens plates as extra elements. It is thereby achieved that the cross-section of the illumination beam at the area of a display panel corresponds to the surface area of this panel to be illuminated and that this beam has a uniform intensity distribution. The available light is then used to an optimum extent and the image on the projection screen has a uniform brightness.

An illumination system which has optimum properties as far as the use of light is concerned and which is preferably used in the image projection device is described in European Patent Application no. 0 467 447. This illumination system comprises a special polarization-sensitive beam splitter and a polarization rotator. The beam splitter splits the incident illumination beam into two sub-beams having different directions of polarization, one of which is directly suitable for modulation by the display panel. The polarization rotator converts the second sub-beam into a beam having the same direction of polarization as the first sub-beam. The sub-beams exiting from the combination of beam splitter and polarization rotator jointly constitute one beam which passes through the display system with the suitable direction of polarization.

Said embodiments of the illumination system have been found very useful in practice, because they yield a large light intensity per surface unit on the projection screen, in spite of the fact that a liquid crystalline display panel has a low transmission and, moreover, is imaged in a magnified form.

When the image projection device described above is operated, the user will first have to focus the projected image on the projection screen manually, i.e. he will have to adapt the focusing of the projection lens to the distance between the plane of a display panel and the screen. During use, this distance may change due to, for example temperature variations within the projection device, or movements of the projection screen. Then the user midst focus again. Moreover, the projection lens may be in the form of a zoom lens for adjusting the size of the projected image or a part of this image. For a conventional image projection device such a zoom lens will not only have to comprise a main lens group, a front lens group and a variator lens group with which the image size is adjusted, but also a compensator lens group with which the focus variation due to the movement of the variator group is compensated. By providing the image projection device with an automatic focus servo system according to the invention, not only the manual focus setting may be dispensed with but it is also sufficient to use a zoom lens comprising the three first-mentioned lens groups only. In fact, a focus-error caused by zooming is now detected by means of the focus servo system and eliminated by moving the front lens group. A zoom lens having three lens groups can be made at lower cost than a zoom lens having four lens groups, which is important, particularly for consumer apparatuses.

Figure 2:
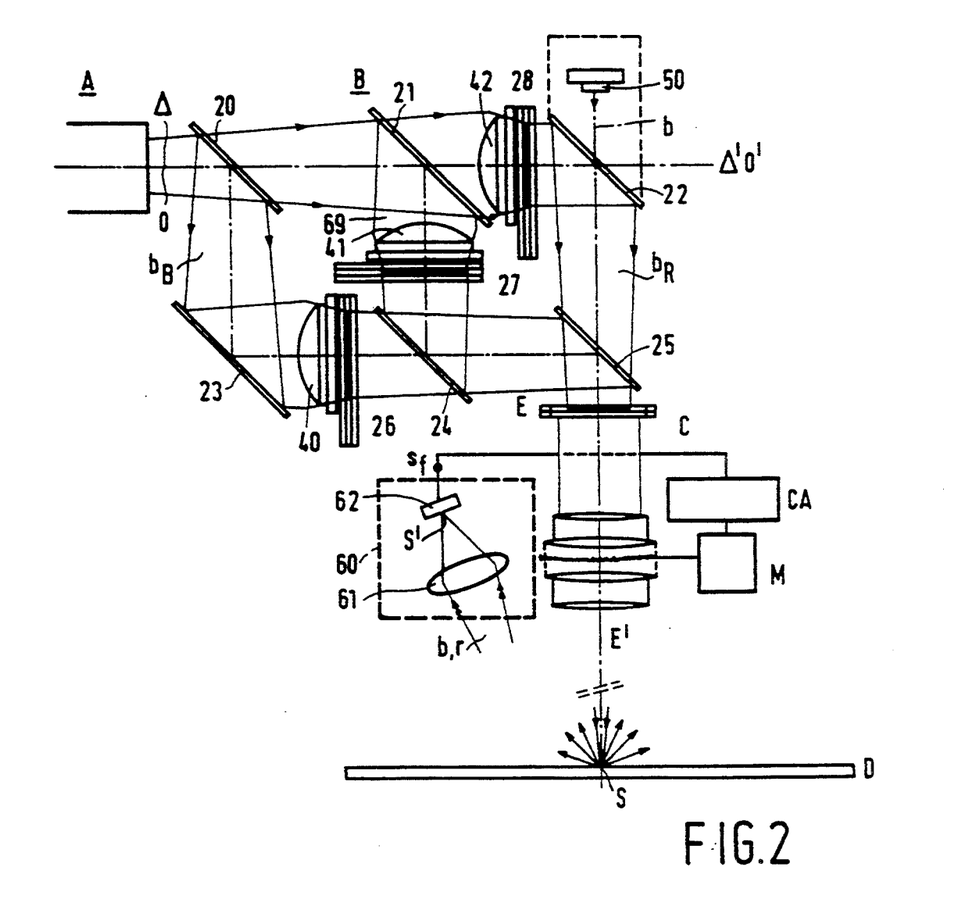
FIG. 2 shows an image projection apparatus with a focus servo system according to the invention.

FIG. 2 shows the principle of the image projection device according to the invention by way of an example of a color television projection device. This device again comprises the three main portions: the illumination system A, the display system B and the projection lens system C in the form of a zoom lens. The principal axis OO' of the illumination system is in alignment with the optical axis DD' of the apparatus which in the embodiment shown is first divided into three sub-axes, which sub-axes are later combined to one optical axis which may coincide with the optical axis EE' of the projection lens system. To obtain an optimum image contrast, the axis EE' may effectively extend at an acute angle to said sub-axes. Effectively is understood to mean: apart from possible angles of 90° caused by reflectors, as occur in FIG. 2.

The beam from illumination system A is incident on a color-selective reflector 20, for example a dichroic mirror which reflects, for example the blue color component $b_B$ and passes the rest of the beam. This beam portion meets a second color-selective reflector 21 which reflects the green color component $b_G$ and passes the remaining red color component $b_R$ towards a reflector 22 which reflects the red beam towards the projection lens system. The reflector 22 may be a neutral reflector or a reflector which is optimized for red light. The blue beam is reflected towards a display panel 26 in the form of a liquid crystalline panel by means of a neutral or blue-selective reflector 23. This panel is electronically driven in known manner so that the blue component of the image to be projected appears on this panel. The beam modulated with the blue information reaches the projection lens system C via a color-selective reflector 24, which passes the blue beam and reflects the green beam, and a further color-selective reflector 25 which reflects the blue beam. The green beam $b_G$ traverses a second display panel 27 where it is modulated with the green image component and is then successively reflected towards the projection lens system C by the color-selective reflectors 24 and 25. The red beam $b_R$ traverses a third display panel 28 where it is modulated with the red image component and subsequently reaches the projection lens system C via the reflector 22 and the color-selective reflector 25.

The blue, red and green beams are superimposed at the input of this lens system so that a color image which is magnified by this system on a projection screen not shown in FIG. 2 is produced at this input.

The optical path lengths between the output of the illumination system A and each of the display panels 26, 27 and 28 are preferably equal so that the cross-sections of the beams $b_B$, $b_G$ and $b_R$ are equal at the area of their display panels. Moreover, the optical path lengths between the display panels 26, 27 and 28 and the entrance aperture of the projection lens system are equal so that all the differently colored scenes are satisfactorily focused on the projection screen.

Lenses 40, 41 and 42 may be arranged in front of each one of the display panels 26, 27 and 28, which lenses jointly ensure that all radiation from the exit plane of the illumination system is concentrated in the entrance pupil of the projection lens system C. Such lenses 40, 41, 42 may alternatively be arranged behind the display panels instead of in front of them. It is alternatively possible to have the function of each lens fulfilled by two lenses, one of which is arranged in front of each display panel and the other is arranged behind each display panel.

Instead of the transmissive display panels shown in FIG. 2 the image projection device may comprise reflective display panels. Such device may be implemented as shown in FIG. 28 of European Patent Application no. 0 467 447.

Instead of a display system having three monochrome panels, the color image projection device may alternatively be provided with a display system having only one display panel, viz. a composite-or-color panel. This color panel then comprises a number of pixels which is, for example three times as large as the number of pixels of a monochrome panel. The pixels of the color panel are arranged in accordance with three groups with which a red, a green and a blue sub-image is generated. One pixel of each group is associated with a single pixel on the projection screen. For example, a separate color filter is arranged in front of each pixel, which color filter only passes the color desired for the relevant pixel. This color panel may also be a transmissive panel or a reflective panel.

The three chrominance channels of the color image projection device may alternatively be accommodated in separate units each comprising their own illumination system and a display panel. The red, green and blue beams supplied by these units and modulated with image information are combined by, for example dichroic mirrors and subsequently reach the projection lens. Such an embodiment of the image projection device is shown in FIG. 29 of EP Application no. 0 467 447.

The focus servo system comprises a radiation source 50, a radiation-sensitive detection system 60, an electronic amplifier-and-control circuit CA and a motor M. The source 50 emits invisible radiation, and is for example a light-emitting diode or a semiconductor laser emitting an infrared radiation beam b. The reflectors 22 and 25 are formed in such a way that they pass this beam. The beam b subsequently traverses the projection lens C and forms a radiation spot (S) on the projection screen (D). This radiation spot is the image of the source 50 formed by the projection lens. The projection screen reflects a part of the radiation of the beam b towards the detection system 60 which comprises a lens 61 and a detector 62. The lens 61 re-images the spot S into a secondary spot S' on the detector 62. The detector 62 supplies an output signal, or focus-error signal, $S_f$ which is dependent on the extent to which the source 50 is sharply imaged on this screen, as will be described hereinafter. Since the plane of the source 50 is the mirror image with respect to the reflector 22, the reflector 25 and the reflectors 24 and 25 of the plane of the display panels 28, 26 and 27, respectively, the signal $S_f$ is also indicative of the extent to which these panels are focused on the screen. If the display panel appears to be defocused on the screen, for example because the screen has been moved along the optical axis or because the focal length of the projection lens has been changed, the focusing of the projection lens can be adapted by means of the signal $S_f$ in such a way that a sharp image is again formed on the screen. To this end the signal $S_f$ is applied to the electronic amplifier and control circuit CA which supplies a control signal $S_c$ for the motor M. For example, the focusing group of the projection lens can be moved with respect to the other lens group of the lens by means of this motor.

Figure 3:
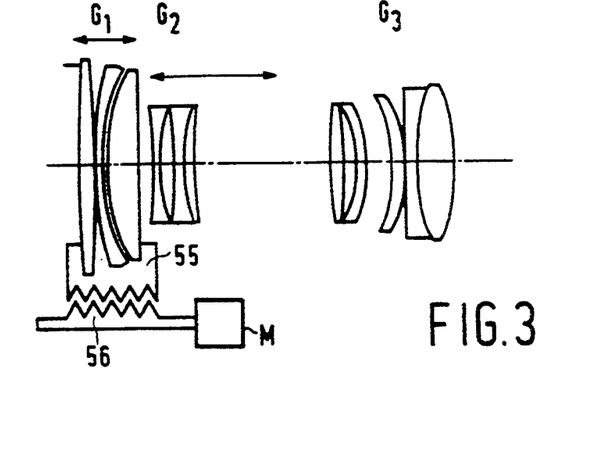
FIG. 3 shows a projection lens system for use in this apparatus.

FIG. 3 shows an embodiment of a projection zoom lens. This lens has three lens groups $G_1$, $G_2$ and $G_3$ each comprising a plurality of lens elements. $G_3$ is the main lens group which supplies the greater part of the lens power. $G_1$ is the focusing lens group, or the front lens group which faces the display system and with which the focus can be set by moving it by means of the motor M and the symbolically shown rack (55) and pinion (56) gearing. A variator group $G_2$ is arranged between the groups $G_1$ and $G_3$. This group may be moved in the space between the groups $G_1$ and $G_3$ by a further motor (not shown) so that the local length can be adjusted. Such a movement causes a change of the image plane of the projection lens, which change must be compensated for. However, since this change is detected by the focus-error detection system, it can be compensated by moving the front group $G_1$. The image sharpness or definition on the projection screen could also be controlled by means of a fourth, movable lens group referred to as compensator group whose movement is coupled to that of the variator group so as to be able to compensate for the change in image plane due to movement of the variator group. Such a fourth lens group renders the projection lens more complex and expensive.

Figure 4:
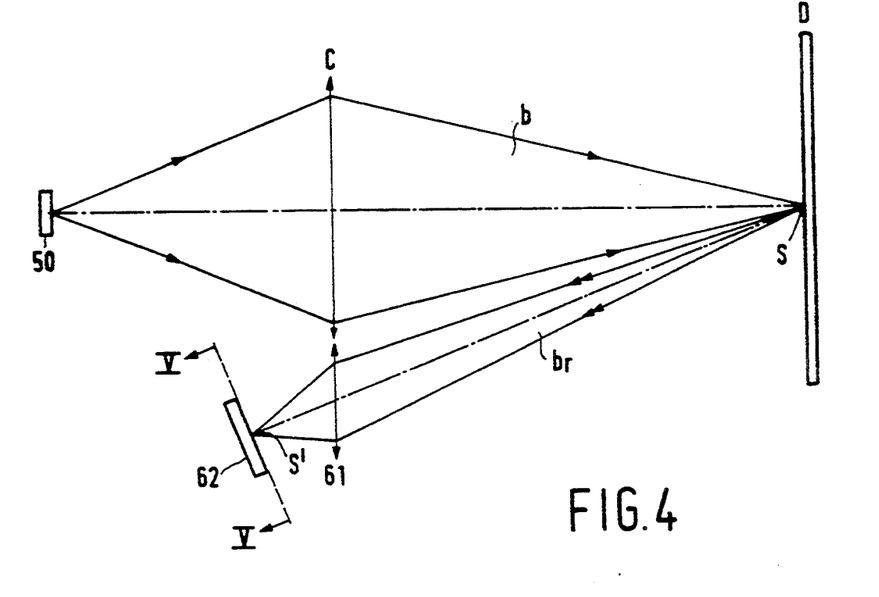
FIG. 4 shows a first embodiment of a focus-error detection system.

FIG. 4 shows schematically a first embodiment of the focus-error detection system. The element corresponding to those of FIG. 2 are indicated by the same reference numerals. Since the projection screen D is a diffusing screen part of the radiation of the focus measuring beam b is diffusely reflected, so that the spot S can be considered as a secondary radiation source. Part of the reflected radiation, i.e. the reflected focus measuring beam, is incident on lens 61. This lens images the secondary radiation source S into a spot S' on the detector 62. Preferably the lens 61 has a large depth of focus so that the image is formed at a constant distance f' from this lens irrespective of the focus condition of the projection lens with respect to the projection screen. This focus condition does determine the size of the spot S and consequently that of the secondary spot S'. If the auxiliary source 50 is sharply imaged on the screen D the spot S' has the minimum size.

Figure 5:
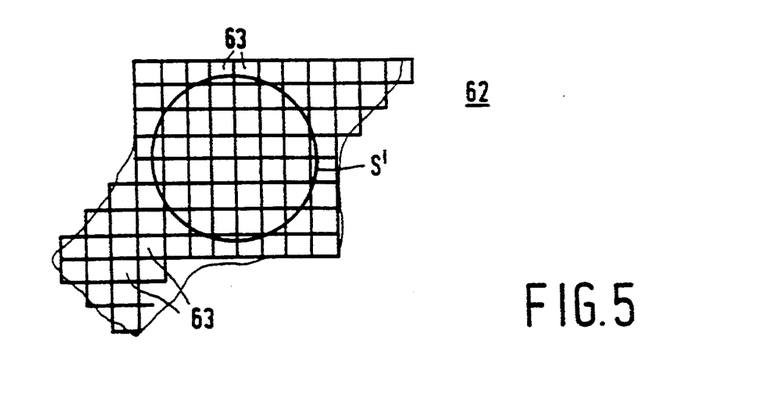
FIG. 5 shows a detection unit for such system.

The size of spot S' may be determined by an array of photodiodes, for example a so-called CCD-array, which diodes are read out separately. FIG. 5 shows some of the photodiodes 63 of such array 62. By determining the number of photodiodes that are illuminated, i.e. covered by the spot S', the size of this spot can be located. Instead of a two-dimensional array also a linear array of photodiodes can be used. The photodiodes can be read out via line and/or column electrodes which are coupled to an electronic circuit for processing the diode signals and wherein the number of illuminated diodes is counted.

Figure 6:
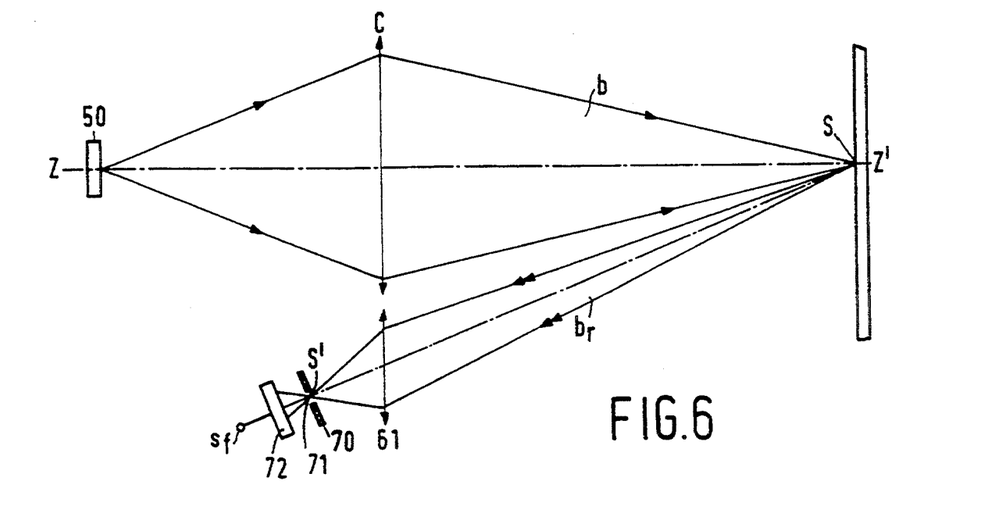
FIG. 6 shows a second embodiment of a focus-error detection system.

In FIG. 6 a second embodiment of the focus-error detection system is depicted. This embodiment comprises a diaphragm 70 at the location where the image S' of the spot S is formed when the focus measuring beam is sharply focused on the projection screen D, and a photodetector 72 arranged behind this diaphragm. The opening 71 of the diaphragm corresponds to the size the spot S' has if the spot S is a sharp image of the radiation source 50. In the optimum focus condition, i.e. when the focal length of the projection lens C is adapted to the mutual distance of the source 50 and the screen D, the signal $S_f$ is maximum. When this mutual distance changes the signal $S_f$ decreases.

Figure 7:
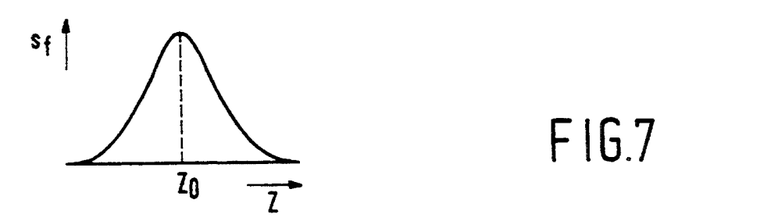
FIG. 7 shows the output signal from this system.
Figure 8:
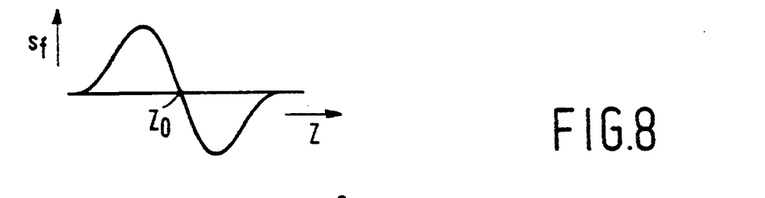
FIG. 8 shows the output signal of a focus-error detection system with an axially moving spot.
Figure 9:
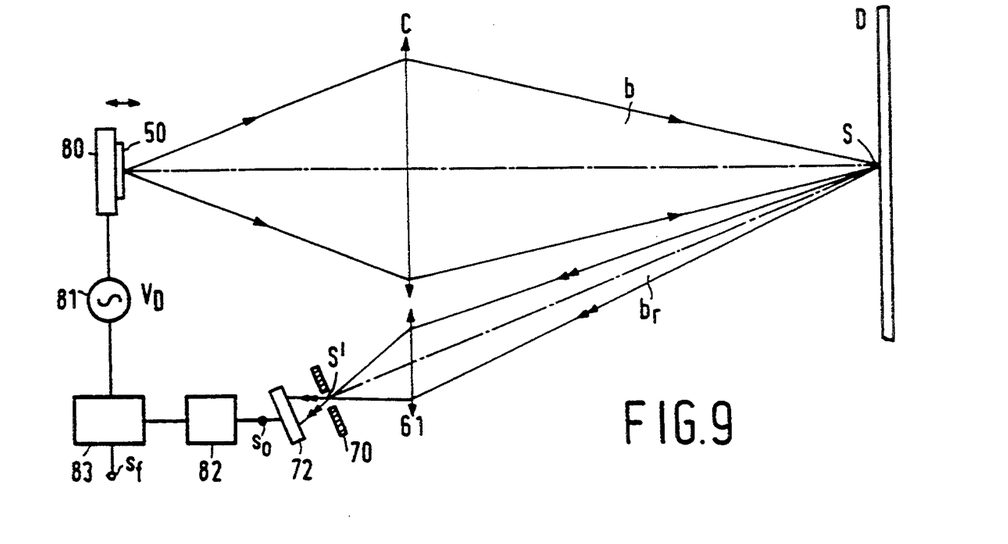
FIG. 9 shows a first embodiment of such system.

The signal $S_f$ as a function of the focus condition 2 of this embodiment and that of the embodiment of FIGS. 4 and 5 is shown in FIG. 7. This signal has only one polarity so that it can only be determined that there is a deviation from the optimum focus condition $Z_0$, but not the sign of such deviation. To determined also this sign, the focus-error should have a shape as shown in FIG. 8. Such signal can be obtained by providing the system with means which provoke a periodic movement of the spot S along the optical axis ZZ' of the projection lens. This periodic moment can be obtained by periodically moving the radiation source 50 along the ZZ' axis. As is shown in FIG. 9, the radiation source may to this end be arranged on a piezoelectric element 80 which is energized by a periodical voltage $V_D$ from a source 81 so that the radiation source is periodically displaced with a small amplitude along the optical axis of the projection lens system C. The image S of the diode laser 50 formed by this system is then displaced periodically along the ZZ' axis so that the amplitude of the detector signal $S_o$ varies periodically.

Figure 10:
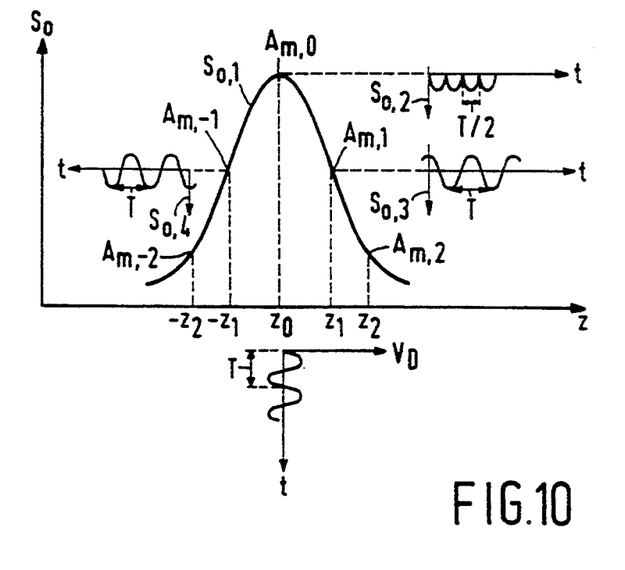
FIG. 10 shows the operating principle of this system.

FIG. 10 illustrates the operation of the focus-error detection system in accordance with FIG. 9 with reference to five diagrams. The first diagram, indicated by $S_{0,1}$, shows the variation of the amplitude Am of the detector signal as a function of the position Z of the projection screen D if the voltage source 81 is switched off. The amplitude is maximal, $A_{m,0}$, if the screen is at the position of the image S of the radiation source 50, i.e. if the focus measuring beam b is focused on the screen. The amplitude will be smaller upon defocusing and assumes the values $A_{m,1}$, $A_{m,2}$ if the screen is shifted towards the position $Z_1$, $Z_2$, respectively, at one side of the image S. When shifting the screen towards the position $-Z_1$, $-Z_2$, at the other side of the image S, the amplitude of the detector signal will be $A_{m,1}$, $A_{m,2}$, respectively.

The lower part of FIG. 10 shows, as a function of time t, the variation of the voltage $V_D$ of the radiation source with which the actuator 80 is energized. This voltage has a period T. Dependent on the position of the screen, the periodical displacement of the image S caused by the voltage $V_D$ will have a different effect on the detector signal. As is shown in FIG. 9, this signal is applied to a filter 82 which passes the AC component only. The right-hand part of FIG. 10 shows the filtered detector signal $S_{0,2}$ which is obtained if the focus measuring beam b is focused on the projection screen. The periodical position modulation of the image S results in that the beam initially focused on the screen is first defocused, subsequently focused again, then defocused again, and so forth. The filtered detector signal $S_{0,2}$ thereby has a period T/2, hence a frequency which is twice that of the voltage $V_D$. If the screen is at the position $Z_1$, the voltage $V_D$ results in the defocusing becoming alternately smaller and larger. The filtered output signal $S_{0,3}$ which is then obtained has a frequency which is equal to that of the voltage $V_D$ and an amplitude which is dependent on the position $Z_1$. If the screen is in the position $-Z_1$, i.e. the defocusing is equally large but opposite to that with the screen in the position $Z_1$, a filtered detector signal $S_{0,4}$ is obtained which has the same frequency and amplitude as the signal $S_{0,3}$, but which is shifted 180° in phase.

The filtered detector signal is compared with the signal $V_D$ in a synchronous detection circuit 83, FIG. 9. If both signals have a different frequency, there will be no focus-error. If the frequencies are equal, defocusing will occur whose sign is determined by comparison of the phase of the filtered detector signal ($S_{0,3}$ or $S_{0,4}$) with that of the signal $V_D$ and whose value is given by the amplitude of the signal $S_{0,3}$ or $S_{0,4}$.

The projection lens system can be corrected again by means of the focus-error signal supplied by the synchronous detection circuit.

Figure 11:
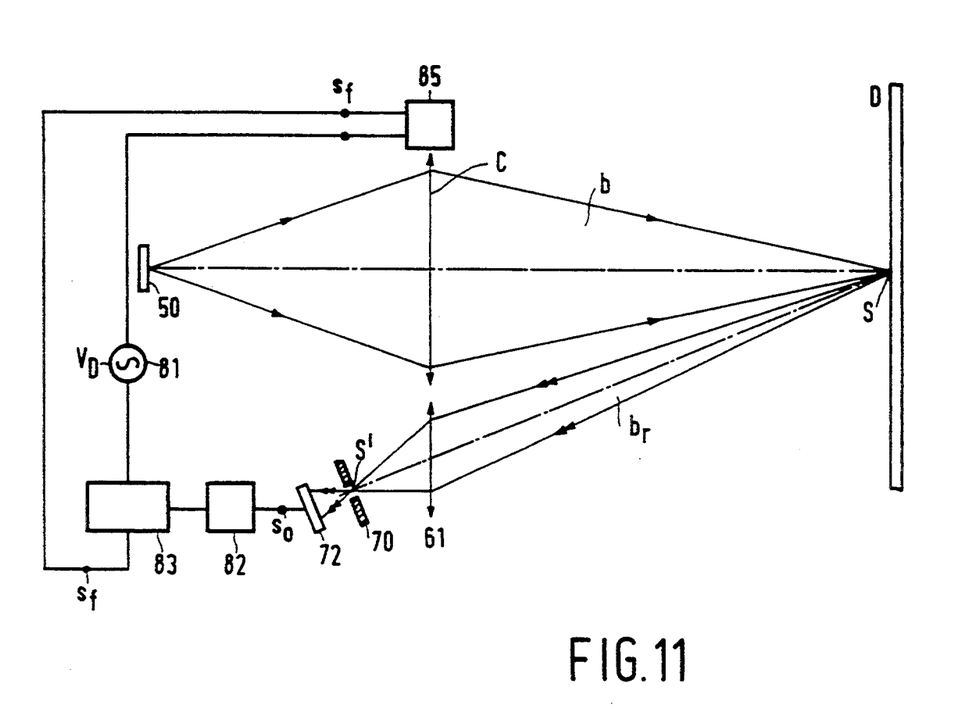
FIG. 11 shows a second embodiment of a focus-error detection system with an axially moving spot.

Under normal circumstances it suffices that the projection apparatus sets its focus automatically before starting a program or in the interval between two successive programs. A periodically varying, or dynamic, focus-error signal can be obtained alternatively, namely be small periodic movement during the focus-setting stage of the lens means, which are used for focus correction, i.e. by periodic movement of the whole projection lens system C or of the front group of this system. This possibility is illustrated in FIG. 11. The embodiment of this Figure comprises the same components as that of FIG. 9, with the exception that the periodic voltage $V_D$, of the source 81 now drives an actuator 85 for moving the projection lens C or part thereof. The focus-error signal $S_f$ obtained from the detection circuit 83 can be supplied to the same actuator when the latter is constructed such as to perform both small fast movements and large movements. After the description of the embodiment of FIGS. 9 and 10 the embodiment of FIG. 11 needs no further explanation.

Figure 12A:
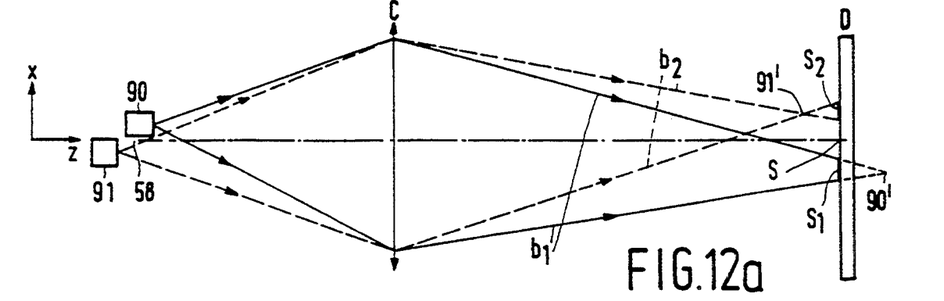
FIGS. 12A and 12B show an embodiment of a focus-error detection system with a multiple radiation source.
Figure 12B:
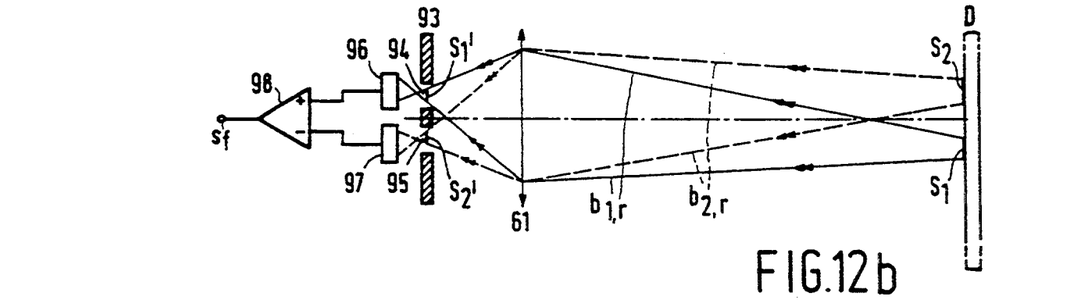

FIGS. 12A and 12B shows an embodiment of a focus-error detection system that supplies a focus-error signal indicating both the magnitude and sense of a focus-error without using a periodically moving element. For clearness sake this system is represented in two figures; FIG. 12A shows the radiation paths from the radiation sources onto the screen D and FIG. 12B the radiation paths from this screen onto the detectors. Two stationary radiation sources 90, 91, LED's or diodelasers, are used which are displaced in both the Z- and X-directions, with respect to a point 58 which may represent the centre of display panel 28 (FIG. 1) and is imaged into spot S on the screen. When the focal length of the projection lens system C is such that said panel is sharply imaged on the screen $D_1$ the focus measuring beams $b_1$ and $b_2$ of the radiation sources 90 and 91 are focused respectively in a point 90' behind the screen and in a point 91' in front of the screen. The beams $b_1$ and $b_2$ thus form spot $S_1$ and $S_2$, onto the screen, which spots constitute secondary radiation sources. These sources have the same size when the distance between point 58 and the screen is adapted to the focal length of lens system C, i.e. when point 58 is imaged into a point image S on screen D.

As shown in FIG. 12B the reflected focus measuring beams $b_{1,r}$ and $b_{2,r}$ from the spots $S_1$ and $S_2$ are captured by the lens 61, which forms images $S_1'$ and $S_2'$ on a diaphragm 93. This diaphragm is located in the plane where spot S is imaged when point 58 is sharply imaged on screen D and has two openings 94 and 95. Behind each of these openings a detector 96, 97 is arranged. The outputs of these detectors are coupled to the input of a differential amplifier 98.

In the in-focus conditions the sizes of spots $S_1$ and $S_2$ are equal and consequently also those of spots $S_1'$ and $S_2'$. The detectors 96 and 97 then receive the same amount of radiation and the focus-error signal is then for example zero. When the screen D moves to the right with respect to the projection lens C, the spots $S_1$ and $S_1'$ become smaller and the spots $S_2$ and $S_2'$ larger. Consequently less radiation of beam $b_{2,r}$ reaches detector 97 and more radiation of beam $b_{1,r}$ reaches detector 96. The focus-error signal is then positive. When the screen D moves to the left the size of the spots $S_1$ and $S_1'$ increases and that of the spots $S_2$ and $S_2'$ decreases and the focus-error signal becomes negative.

Instead of the combination of the diaphragm 93 and the two detectors 96 and 97, in the embodiment of FIGS. 12A and 12B two CCD-sensor may be used, which sensors should be located in the plane of diaphragm 93. The two sensors may be replaced by a single CCD-sensor being provided with the possibility to measure separately the size of two spots.

In the embodiments described above each combination of a diaphragm slit and a detector may be replaced by a detector having a radiation surface corresponding to the size the image spot (S'; $S_1'$; $S_2'$) has when the source (50; 90; 91) is focused on the screen D.

In all embodiments described so far the size of the diaphragm opening, or of the radiation-sensitive surface of the detector is preferably of the same order as the size the image spot S' has when the radiation source is focused on the projection screen in order to have maximum sensitivity for focus-errors.

When the screen D moves over longer distances to the right or to the left in FIGS. 4, 6, 9, 11 or 12 not only the size of the image spot S' will increase, but also the direction of the chief ray of the reflected focus measuring beam $b_r$ captured by lens 61 will change, so that the image spot will move downwards or upwards in the plane of drawing of said Figures. If, for high sensitivity, the diaphragm opening or the sensing surface of the detector is small, it could happen that the image spot walks off from these element so that the focus-error signal gets lost.

Figure 13A:
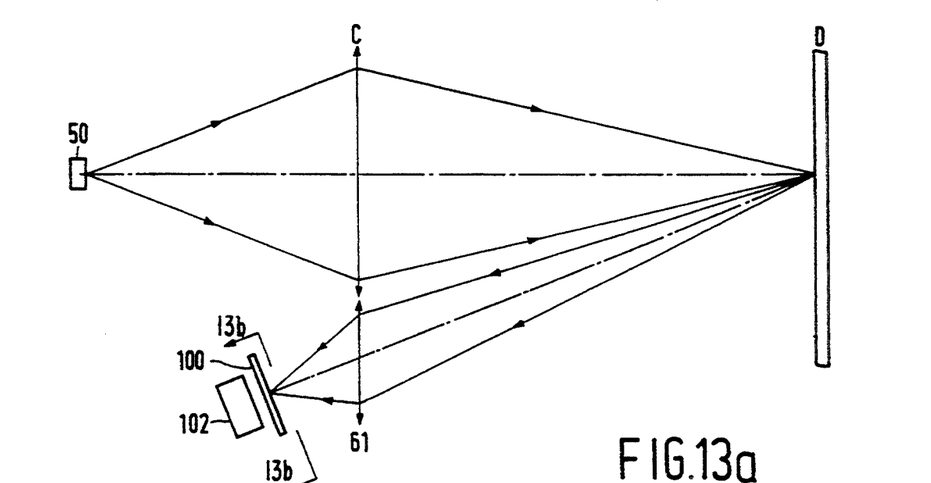
FIGS. 13A and 13B show a focus-error detection system with a slit diaphragm.
Figure 13B:
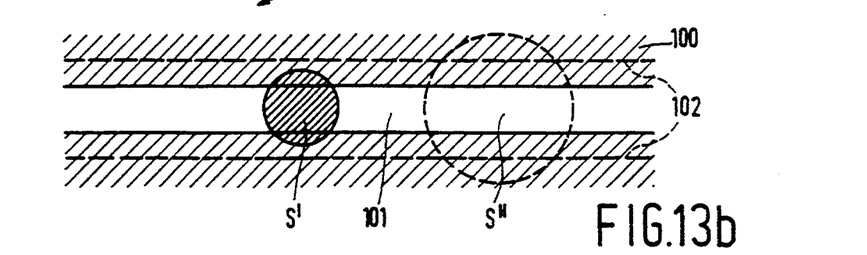

This is prevented in the embodiment shown in FIG. 13A wherein a diaphragm 100 with a slit-shaped opening 101 is arranged in front of a detector 102. FIG. 13B shows a view along line AA' of FIG. 13A of the slit 101 in solid lines, and of the underlying detector 102. The slit extends in a direction in the plane of drawings of FIG. 13A and perpendicular to the optical axis of lens 61. In the in-focus condition the image spot will have the position and size of spot S' so that the detector will receive a maximum amount of radiation. When defocusing occurs the image spot will become larger and will move for example to the right as indicated by spot S''. The detector will receive then less radiation and it will continue to receive radiation because the diaphragm slit and detector are sufficient long.

Figure 14A:
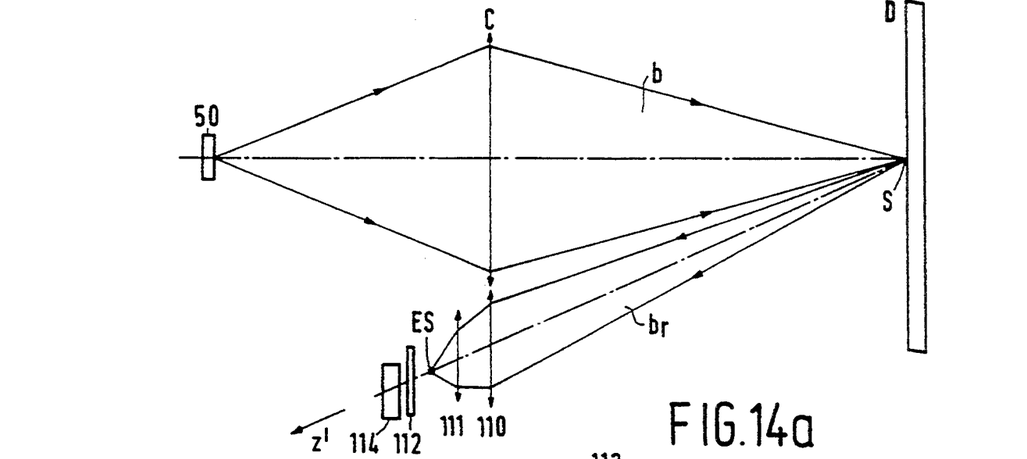
FIGS. 14A and 14B show a focus-error detection system with a cylindrical lens and a slit diaphragm.
Figure 14B:
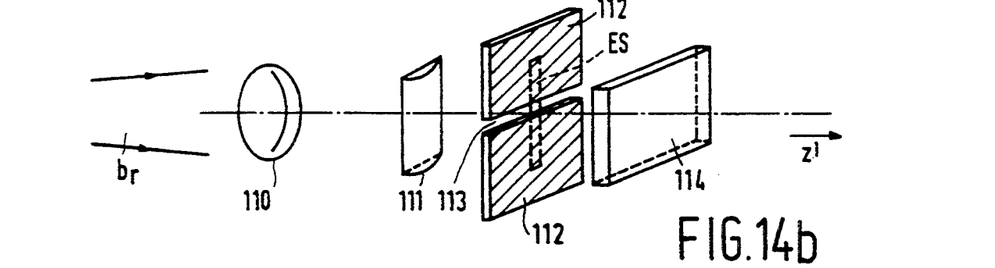

Another possibility to increase the capture range of the focus-error detection system while maintaining the sensitivity resides in arranging a cylindrical lens in the path of the reflected focus-measuring beam and to use a slit diaphragm. These elements 111 and 112 respectively are shown in FIG. 14A arranged one behind the other along the Z'-direction, i.e. the direction the chief ray of the reflected focus-error beam has in the in-focus condition. FIG. 14B shows in a perspective view the radiation path of the reflected beam $b_r$ from an imaging lens 110 onto the detector 114. The elements of FIG. 14B are rotated over 90° about the chief-ray of beam $b_r$ with respect to those of FIG. 14A. In FIG. 14A the cylinder axis of the lens 111 is perpendicular to the plane of the drawing. This lens together with the lens 110 images the spot S into an elongated spot ES on the diaphragm 112 having a slit 113 extending in the plane of drawing of FIG. 14A and located on the chief-ray of the beam $b_1$. The radiation passing through this slit is converted into an electrical signal by the detector 114.

In the in-focus condition the elongated spot ES has a minimum size, so that the amount of radiation passing through the diaphragm slit and received by the detector 114 is maximum. In this embodiment only part of the radiation of beam $b_r$ can pass through the diaphragm slit. When defocusing occurs the elongated spot ES blows up, which means that the radiation density (radiation intensity per unit area) of the elongated spot decreases with the square of the focus-error. The portion of the slit that is covered by the spot ES increases linearly with the focus-error, so that the amount of radiation incident on the detector decreases linearly with increasing focus-error. The movement of the spot ES due to a displacement of the screen D along the optical axis of the projection lens system C is in the length-direction of the slit 113, so that such movement will not result in a change of the radiation incident on the detector.

Instead of with a single cylindrical lens the elongated spot ES can be obtained with a combination of two such lenses having parallel cylinder-axes, or with one or two prisms, or in general with a so-called anamorphotic system, i.e. a system which has in a first direction an optical power considerably different from the optical power in a second direction perpendicular to the first direction.

The embodiments of FIGS. 13A–14B having slit diaphragms and wherein only part of radiation of the focus measuring beam is utilized will function satisfactorily if this beam has sufficient intensity.

Figure 15:
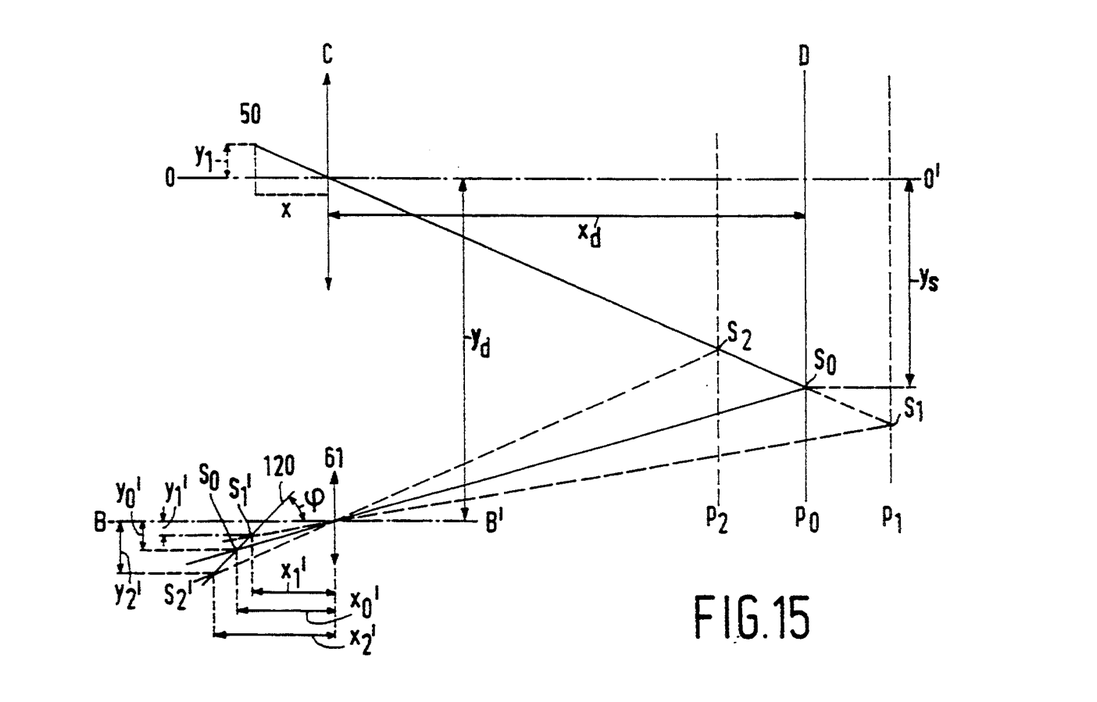
FIG. 15 shows why and how the detection unit should be tilted.

An embodiment of the focus-error detection system wherein a focus measuring beam having a lower intensity can be used, while still having a high sensitivity and a large capture range has the detector, or detector-diaphragm unit arranged at an angle smaller than 90° with the optical axis of the lens 61, such that the image spot will always be formed on the detector. The principle of this embodiment is depicted in FIG. 15. For clearness sake type the dimensions in the Y-direction are exaggerated relative to those in the X-direction. The auxiliary radiation source 50 is arranged at a distance Y from the optical axis OO' of the projection lens system and at a distance X from this lens system. The position $P_0$ of the screen D is the in-focus position. In this position the radiation source is imaged into a spot $S_0$ of minimum size on the screen. This spot is re-imaged by the lens 61 into a spot $S_0'$ at a distance $Y_0'$ from the optical axis BB' of the lens 61 and at a distance $X_0'$ from this lens. When the screen is displaced towards the right into the position $P_1$, a spot $S_1$ is formed on the screen. The lens 61 re-images this spot into a spot $S_1'$, located at a distance $Y_1'$, which is smaller than $Y_0$, from the optical axis BB' and at a distance $X_1'$, which is smaller than $X_0'$ from the lens 61. When the screen is displaced towards the left in the position $P_2$ a spot $S_2$ is formed on the screen. The lens 61 re-images this spot into a spot $S_2'$ located at a distance $Y_2'$, which is larger than $Y_0'$, from the optical axis AA' and at a distance $X_2'$, which is larger than $X_0'$, from the lens. So, upon larger displacements of the screen the re-imaged spot moves along the line 120 through the locations of spots $S_1'$, $S_0'$ and $S_2'$. When the detector, or detector-diaphragm unit, is oriented in this direction the capture range of the focus-error detection system is larger, for example from 2 meters to 15 meters and the sensitivity is still high. In general it is the first surface of the detection unit, through which surface the reflected focus measuring beam enters this unit, that should have the orientation of line 120.

It is remarked that the angle $\phi$ between the line 120 and the optical axis is exaggerated, due to the exaggeration of the Y-dimensions. In practice this angle $\phi$ will be determined by the distances in the X- and Y-directions between the elements of the system. From FIG. 15 it will be clear that:

$$\frac{Y}{X} = \frac{Y_s}{X_d}$$

wherein $Y_s$ is the distance between spot $S_0$ and the optical axis OO' and $X_d$ is the distance between the projection lens system and the screen. On the other hand for the position of the image spot $S_o'$ holds:

$$\frac{Y_0'}{X_0'} = \frac{Y_d - Y_s}{X_d}$$

wherein $Y_d$ is the distance between the optical axes OO' and BB'. This can be written as:

$$\frac{Y_0'}{X_0'} = \frac{Y_d}{X_d} - \frac{Y_s}{X_d} = \frac{Y_d}{X_d} - \frac{Y}{X}$$

In the preferred case that the source 50 is located at the optical axis OO', so for Y=0, holds:

$$Y_0' = X_0' \frac{Y_d}{X_d}$$

In practice it may be required that the distance $X_d$ can be varied between 2 and 15 meters and that the resulting movement of the image spot over the detector should be limited to 5 mm. This requirement can be met with a lens 61 having a back focal distance ($=X_0'$) of 50 mm and with a distance $Y_d$ of approximately 23 cm. The angle $\phi$ is then approximately 80°.

The tilted detector can also be used in the embodiments of FIGS. 4, 6, 9, 11 and 12.

For all embodiments preferably the distance ($Y_d$) between the axis (OO') of the projection lens system and the axis (BB') of the lens 61 is as small as possible, and the angle between the latter axis and the normal to the screen as small as possible.

I claim:

1. Image projection apparatus comprising:
   an image display system having at least one image display panel for generating an image to be projected,
   a projection lens system for projecting the image from display system on a projection screen, and
   a focus error detection system having an auxiliary radiation source delivering a focus measuring beam and a detection unit for converting the focus-measuring beam reflected by the screen in a focus-error signal,
   wherein the improvement comprises that:
   the auxiliary radiation source is arranged in a plane which, viewed from the projection lens system, effectively coincides with the plane of an image display panel,
   the auxiliary radiation source is imaged by the projection lens system into a spot on the projection screen,
   an auxiliary lens system is provided for imaging the spot into a secondary spot on the detection unit, and in that the detection unit includes a measuring unit for measuring the size of the secondary spot.

2. Image projection apparatus as claimed in claim 1, wherein the projection lens system is a zoomlens, and in that the focus-error signal is applied to an actuator of a movable lens group of the zoomlens.

3. Image projection apparatus as claimed in claim 1, wherein the auxiliary radiation source is arranged in the plane of the display panel outside this panel.

4. Image projection apparatus as claimed in claim 1, wherein the auxiliary radiation source is arranged in a plane which is the mirror image of the plane of a display panel with respect to a wavelength-selective reflector which is arranged at an acute angle to the optical axis of the projection lens system.

5. Image projection apparatus as claimed in claim 4, wherein the acute angle is an angle of 45° and in that the auxiliary radiation source is arranged in an even line with the said optical axis.

6. Image projection apparatus as claimed in claim 1, wherein the detection unit comprises a CCD photodiode matrix arranged at the position where the secondary spot is formed upon correct imaging of the auxiliary radiation source onto the projection screen.

7. Image projection apparatus as claimed in claim 1, wherein first surface of the detection unit through which the reflected focus measuring beam enters this unit is arranged at an acute angle with the optical axis of the auxiliary lens system.

8. Image projection apparatus as claimed in claim 1, wherein the detection unit comprises:
  a diaphragm arranged at the position where the secondary spot is formed upon sharp imaging of the auxiliary source onto the projection screen; and
  a photodetector arranged behind the diaphragm opening.

9. Image projection apparatus as claimed in claim 8, wherein the size of the diaphragm opening corresponds to the size of the secondary spot formed when the focus measuring beam is focused on the projection screen.

10. Image projection apparatus as claimed in claim 8, wherein the diaphragm opening is a slit, the length direction of which is parallel to the direction along which the secondary spot moves upon displacement of the projection screen along the optical axis of the projection lens system.

11. Image projection apparatus as claimed in claim 8, wherein the detection unit comprises, in this order and viewed from the auxiliary lens system, an anamorphotic system, a diaphragm having a slit opening with the slit direction, substantially parallel to the direction of maximum optical power of the anamorphotic system, and a photodetector.

12. Image projection apparatus as claimed in claim 1, wherein means are provided for axially moving the spot projected on the screen with respect to the projection screen and in that the output of the detection unit is coupled to one input of a signal processing circuit, another input of which is coupled to the said means for axially moving the spot projected on the screen.

13. Image projection apparatus as claimed in claim 12, wherein the means for axially moving the spot projected on the screen are constituted by an actuator for periodically and axially moving the auxiliary radiation source.

14. Image projection apparatus as claimed in claim 12, wherein the means for axially moving the spot projected on the screen are constituted by an actuator for periodically moving a movable lens group of the projection lens system.

15. Image projection apparatus as claimed in claim 1, wherein the radiation source comprises at least two radiation emitting elements displaced from one another in both a first direction parallel to the optical axis of the projection lens system and a second direction perpendicular to the first direction and in the detection unit comprises a number of detectors corresponding to the number of radiation emitting elements.

* * * * *